Aug. 25, 1925.
W. P. KING
1,550,821
MACHINE FOR MOLDING PLASTIC MATERIAL
Filed Oct. 4, 1924   3 Sheets-Sheet 1
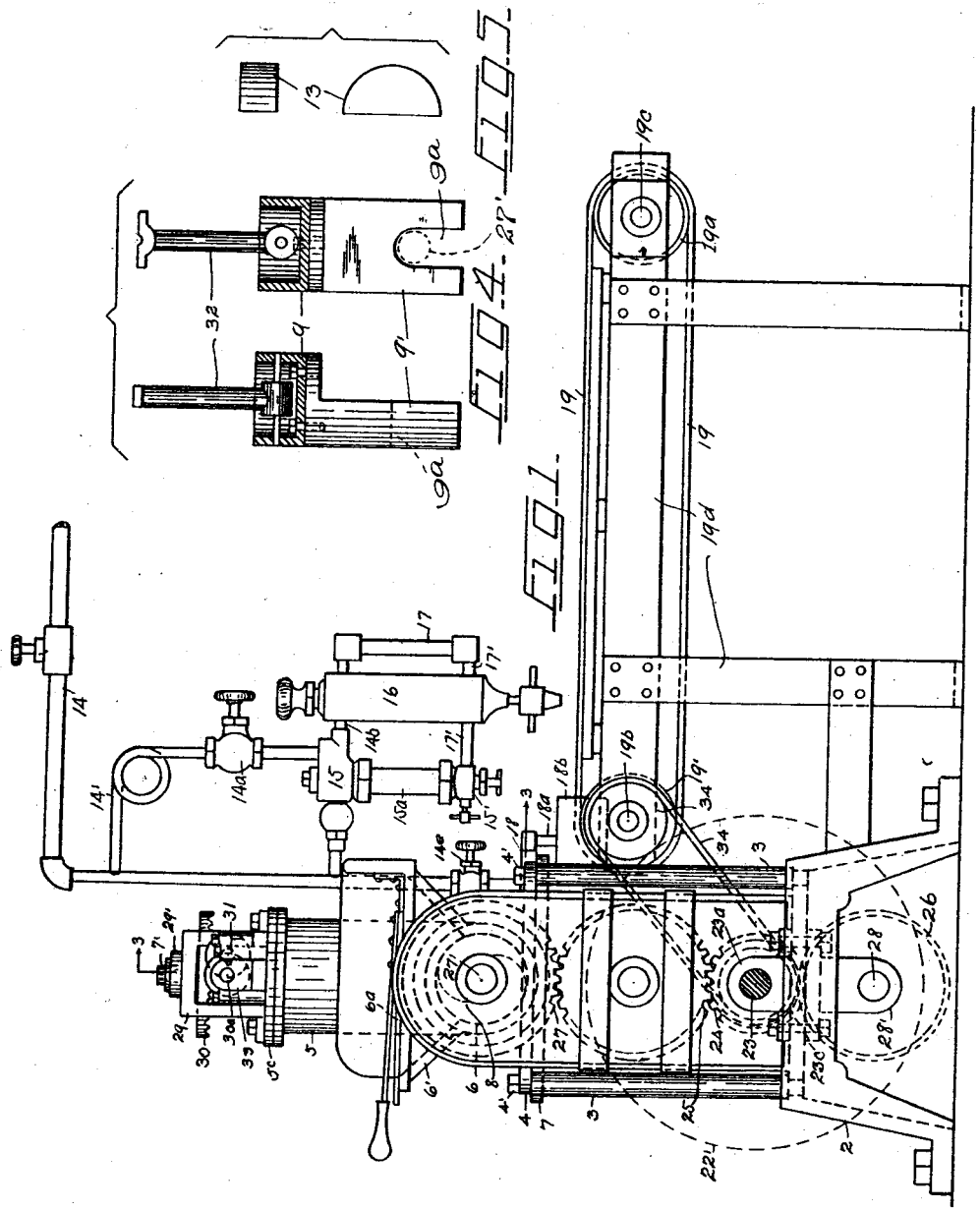
INVENTOR
William P. King
By Harry De Wallace
ATTORNEY Aug. 25, 1925.  
W. P. KING  
1,550,821  
MACHINE FOR MOLDING PLASTIC MATERIAL  
Filed Oct. 4, 1924   3 Sheets-Sheet 2
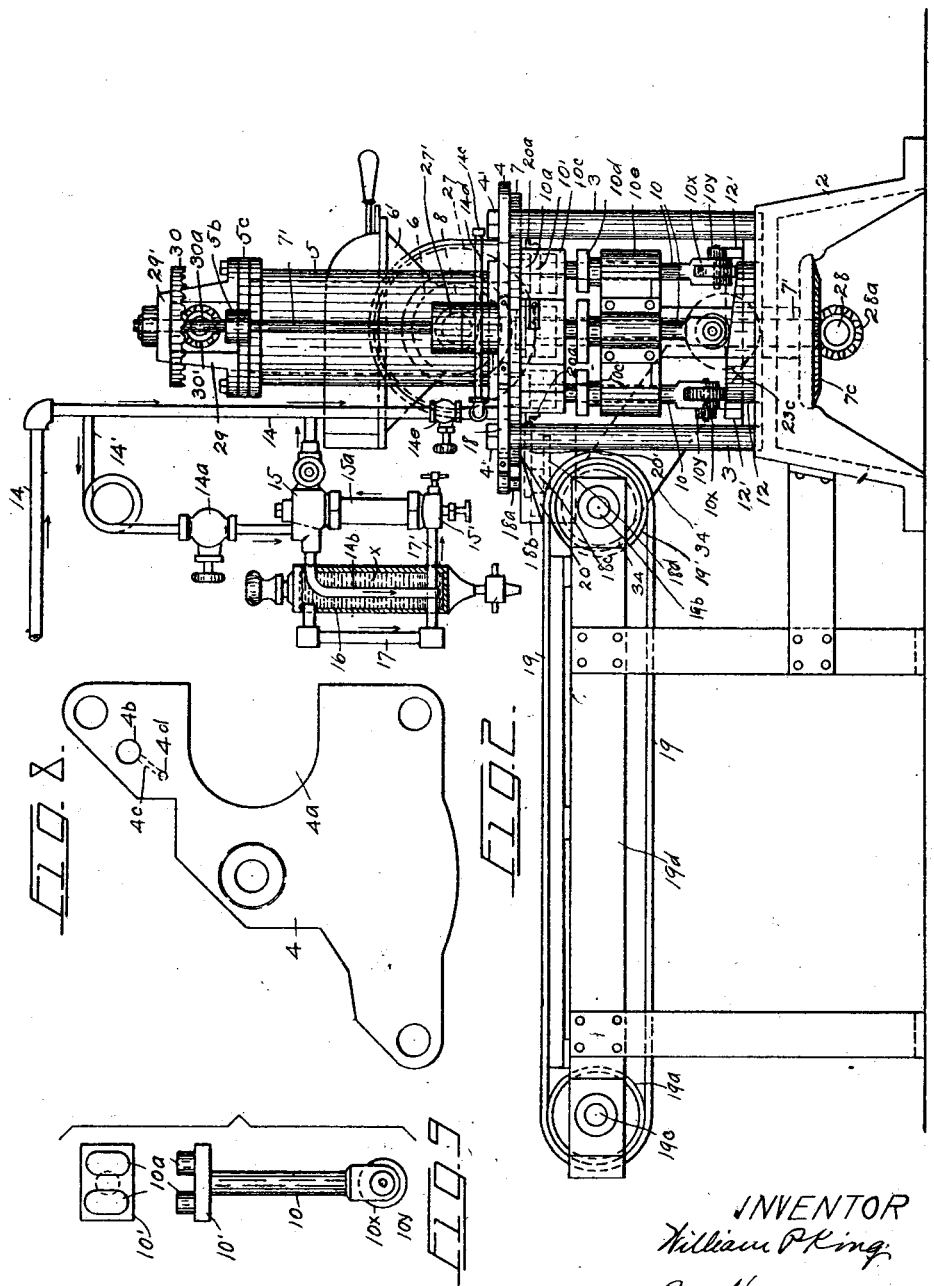
INVENTOR  
William P King  
By Harry D Wallace  
ATTORNEY Aug. 25, 1925.
W. P. KING
1,550,821
MACHINE FOR MOLDING PLASTIC MATERIAL
Filed Oct. 4, 1924     3 Sheets-Sheet 3
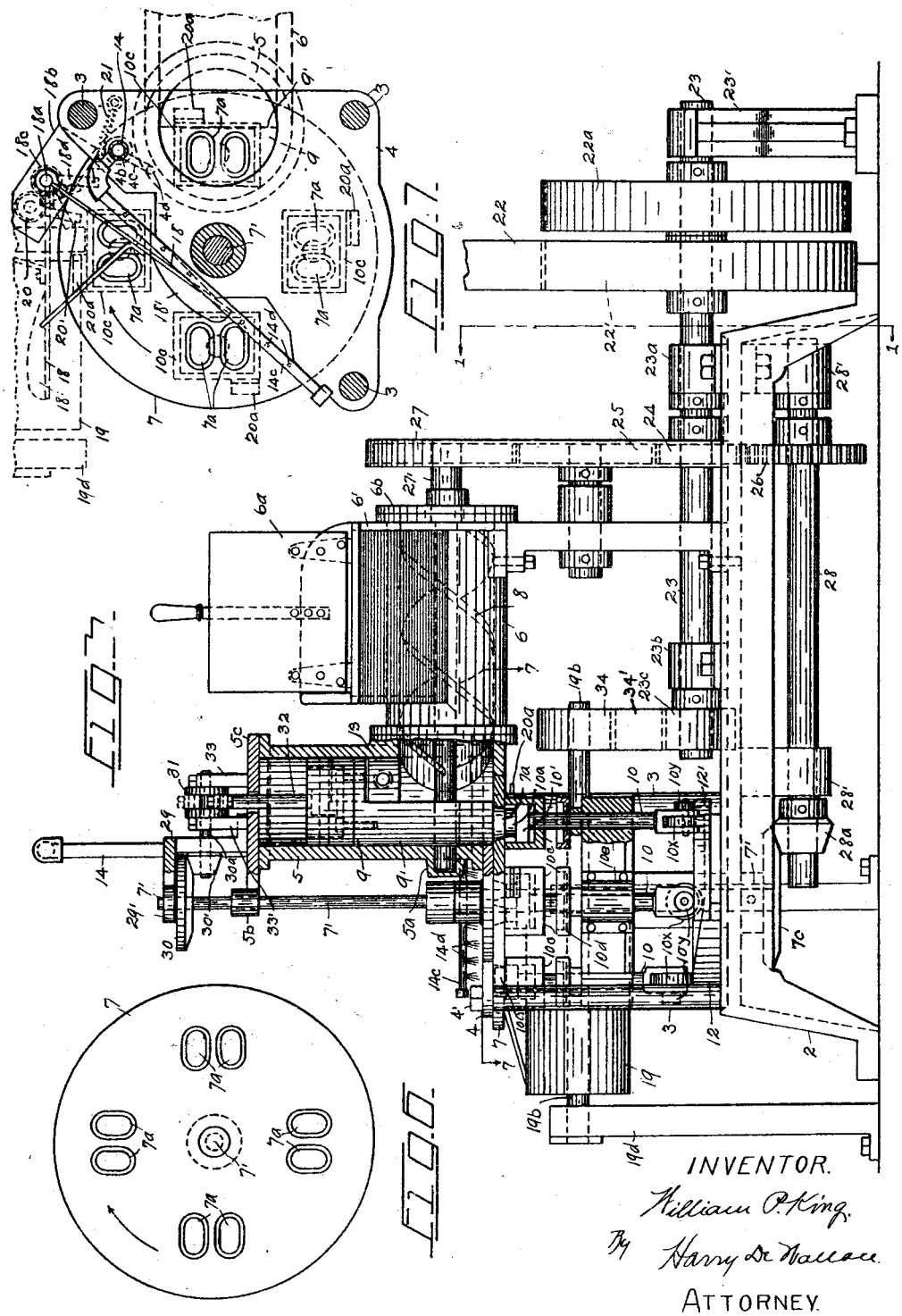
INVENTOR.
William P. King.
By Harry D. Wallace.
ATTORNEY.

Patented Aug. 25, 1925.

1,550,821

UNITED STATES PATENT OFFICE.

WILLIAM P. KING, OF SYRACUSE, NEW YORK.

MACHINE FOR MOLDING PLASTIC MATERIAL

Application filed October 4, 1924. Serial No. 741,597.

*To all whom it may concern:*

Be it known that I, WILLIAM P. KING, a citizen of the United States, residing at Syracuse, in the county of Onondaga and State of New York, have invented certain new and useful Improvements in Machines for Molding Plastic Material, of which the following is a specification.

This invention relates to a machine for pressing and molding food and other products from plastic and semi-plastic substances, and has for its object to provide a self-feeding automatic press, especially useful for molding cakes or bars of candied cocoanut and other compressible, and more or less sticky, stock; the candy or stock already mixed in bulk and flavored, being disposed in a hopper from which it is conveyed by a worm into a pressing chamber, in which a reciprocating plunger or ram of novel construction presses the stock into several molds at each working stroke; the said molds being formed at regular intervals in a circular path, in a disc-shaped table, which is in constant rotation, the operation of the table and plunger being accurately timed to effect the pressing and molding of a plurality of cakes during each revolution of the table. A further object is to provide novel, simple and effective means for successively lubricating, as well as for heating the molds and certain adjacent parts with which the sticky material comes in contact, for preventing adhesion of the candy to said parts, and thereby hindering the proper functioning of the pressing and ejecting mechanisms. A further object is to provide means for ejecting the compressed cakes from a number of molds at a single operation without stopping the machine; the ejectors travelling with the table and being arranged to form the bottoms of the molds during the pressing intervals. A further object is to provide a series of novel cams which, at regular intervals in the circuit of the table, operate a lever for sweeping the ejected cakes from the table on to a continuously travelling belt conveyor, which delivers the finished product of the molds at a distance from the machine. And a further object is to provide a press of the class which is adapted for continuous automatic pressing and molding of any plastic or sticky substances.

I attain these objects by the means set forth in the detailed description which follows, and as illustrated by the accompanying drawings, in which—

Figure 1 is a vertical cross-section, taken on line 1—1 of Fig. 3. Fig. 2 is a front end elevation of the machine. Fig. 3 is a front side elevation and partial central vertical longitudinal section, the section being taken on line 3—3 of Fig. 1, showing the press-plunger in relation to one of the molds. Fig. 4 is respectively a front and a side elevation and partial central vertical section of the plunger. Fig. 5 is respectively a side and an end view of the semi-circular guide and stripper. Fig. 6 is a top plan view of the molding table. Fig. 7 is a horizontal section, taken on line 7—7 of Fig. 3; showing certain of the molds passing the pressing position; also showing the disposition and action of the lever that sweeps the molded articles from the table and the means for spraying the molds and table with hot moist vapor. Fig. 8 is a top-plan view of the guard-plate which supports the press-cylinder and partially covers the molding table. And Fig. 9 is a detached view, in top-plan and elevation respectively, of one of the ejecting elements.

In the drawings, 2 represents an elongated frame, which supports substantially the whole of the pressing mechanism; and from one end of which rise a number of similar posts 3, upon whose threaded top ends is mounted horizontally a triangular guard-plate 4, which is rigidly held in place by nuts 4'. Upon the plate 4 is mounted the upright press cylinder 5, whose normally open bottom end registers with a corresponding opening 4ª of the plate. 6 represents a horizontal cylinder, which extends rearwardly at right angles to and communicates with the cylinder 5, the cylinder 6 being formed with an upwardly facing hopper 6', into which the material to be molded is deposited in bulk, and 6ª represents a hinged cover for preventing escape of the material and for excluding dust from the hopper.

7 represents the circular molding table, which is rotatably disposed beneath and in close frictional contact with the guard 4, as shown in Figs. 1, 2, 3, 6 and 7. The table 7 is rigid on and is driven by an upright shaft 7', and is provided with a plurality of tapering oval molds or openings 7ª, which are preferably arranged in pairs, as shown in Figs. 6 and 7; the said molds being disposed in a circular path, and the several pairs being spaced equidistantly in the circle. The disposition of the molds 7ª is such that the several pairs pass beneath the press cylinder 5, where they are successively filled with the relatively thick pasty stock, by the downward strokes of a piston-plunger 9, which reciprocates in the cylinder 5; the stock to be molded being moved horizontally from the hopper 6' into the cylinder 5, by means of a worm 8. The table 7 rotates constantly, and the molding strokes of the plunger 9 are timed to completely fill the molds of each pair, while the latter are being moved across the lower open end of the press cylinder 5. The molds 7ª are preferably clear openings through the table 7, and it is necessary to provide means for closing the bottoms of said openings. For this purpose, a number of similar ejectors— one for each pair of molds—are provided, the said ejectors comprising upright rods 10, whose top ends are formed with rectangular heads 10', above which project oval bosses 10ª of a size to operatively fit and close the open bottoms of the molds. The height of these bosses preferably corresponds to the depth of the mold cavities, and after the cavities are filled and the rotation of the table 7 carries the molds a suitable distance from the filling position, the ejectors are raised by means of a circular cam 12 (see Fig. 3) sufficiently for the bosses 10ª to force the cakes upwardly to the level of the top of the table 7. The ejecting of the cakes occurs immediately after the filled molds pass from beneath the guard 4, as shown at the right in Fig. 7. In order to effect the proper filling of the molds during the short interval each pair is passing beneath the rapidly descending plunger 9, the lower portion of the plunger is reduced to one-half the area of the bore of the press cylinder 5, as shown at 9' in Figs. 3 and 7, and the worm 8 is correspondingly lengthened and extended into the vacant half of the cylinder, for shortening the distance through which the material must travel during the short and quick upstrokes of the plunger, in order to supply material for filling the next pair of molds. 13 represents a semi-circular guide-block, which is rigidly disposed in the vacant portion of cylinder 5 above the bore of the cylinder 6. This guide block tends to increase the length of cylinder 6, and prevents the worm from forcing the stock upwardly instead of straight ahead towards the filling position. By this construction and arrangement, the stock has only a few inches to travel while the plunger is moving upwardly in order to refill the forward half of the press cylinder beneath which the next pair of molds 7ª will pass. The flat vertical face of the block 13 preferably lightly contacts with the corresponding face of plunger 9, and accordingly serves to strip the sticky material from the plunger during its upstrokes.

The tendency of the sticky sugary stock to cling to the molds and other metal parts of the machine, is overcome in the present construction by spraying the molds 7ª, and the top surface of the table 7 with steam, with which is incorporated a suitable edible oil. For this purpose, I provide a lubricating mechanism, which comprises the following parts: A pipe 14, receiving steam from any suitable source, conducts the steam directly to an opening 4ᵇ of the guard 4, from which a blind duct 4ᶜ leads to a small downwardly facing port 4ᵈ, which discharges the steam continuously against the top face of the table 7, in the path of the molds 7ª. The pipe 14 is tapped by another pipe 14', which by-passes a portion of the steam through a valve 14ª to the heads 15 of a sight-gage, which includes a glass tube 15" and a base 15ª. The steam from pipe 14' passes through a separate passage in the part 15, and the steam together with the water resulting from the condensing of the steam gravitates through a tube 14ᵇ into the bottom of an oil-chamber 16, where the water collects, and upon which the oil, as $x$, floats. The oil is supplied to the chamber 16 through a suitable opening in its top. The water mingles more or less with the oil $x$, and due to the pressure derived from the pipe 14, the oily mixture is forced out of the top end of the container 16, thence downwardly through another glass tube 17, thence through a tube 17' that passes through the lower end of cylinder 16, into the part 15ª. The lubricant then flows upwardly through the tube 15', thence through the head 15 and into pipe 14, by which it is carried towards the guard 4 and table 7, as explained. The lower end of pipe 14 is tapped by a horizontal pipe 14ᶜ, which extends across the top of the disc 7, said pipe having a number of small openings 14ᵈ in its under side, by which the hot oily vapor is sprayed, as shown in Fig. 3. The pipe 14 is provided with a valve 14ᵉ, by which the flow of steam may be regulated, or stopped at will.

The heads of the ejectors are preferably inclosed in similar boxes 10ᶜ, which are rigid to the bottom side of the table 7, the rods 10 slidably passing throuh the bottoms of the boxes, through drip-pans 10ᵈ, and guides 10ᵉ. The bottom ends of the rods 10 are fitted with rollers 10ˣ which ride upon the cam 12, and by similar smaller rollers 10ʸ, which traverse a semi-circular cam 12', which is arranged for limiting the reciprocating movements of the ejectors, as for example, to the depth of the molds 7ª. When the rollers 10ˣ are riding on the highest portions of cam 12, the rollers 10ʸ are free from the cam 12', as shown in Figs. 2 and 3. All of the ejectors act independently and are arranged to travel with the table 7, and successively close the bottoms and effect the emptying of the molds, as explained.

The ejected cakes are swept from the top face of the table 7, by a lever or arm 18, which extends horizontally across the exposed portion of the table, and is provided near its free end with a knife-like part 18', which rides frictionally on the table, and remains beneath the cakes until they are carried beyond the periphery of the table, where they gravitate to a constantly moving belt conveyor 19, which carries the cakes to a convenient packaging point. The remote end of the lever 18 is rigid to the upper end of a shaft 18$^a$, which is journaled in a box 18$^b$, said shaft supporting a gear 18$^c$, which is driven by another gear 20, the latter gear being provided with an arm 20' that projects into the path of cams 20$^a$, which are carried by the boxes 10$^c$, the said cams being arranged to successively engage the arm 20' at the instant the cakes are fully ejected from the molds at the opposite side of the table. The cams 20$^a$ swing the arm 20', and accordingly rock the gears 18$^c$—20 in the direction for swinging the lever 18 from the full line to the dotted line position, shown in Fig. 7. As soon as the cams 20$^a$ become free from the arm 20', a spring 21, attached to an arm 18$^d$ of gear 18$^c$ reverses the movements of said parts, and restores the sweep 18 to the full line position shown in Figs. 2 and 7, ready for the next operation, and so on.

The entire mechanism of the press is actuated and driven by a constantly moving belt 22, which drives a pulley 22', the belt being arranged to idle on a similar pulley 22$^a$. The pulley 22' is rigid on a main shaft 23, which is journaled in bearings 23', 23$^a$ and 23$^b$, and intermediate its ends said shaft supports and drives a pinion 24, which directly drives gears 25 and 26. The gear 25 drives a similar gear 27, which is rigid on a shaft 27', upon which the worm 8 is mounted. The shaft 27' is journaled respectively in a socket-bearing 5$^a$ of the press-cylinder, and in a cap 6$^b$ that closes the outer end of the cylinder 6. The lower end of the plunger is slotted, as at 9$^a$ (see Fig. 4) for straddling and affording clearance for the shaft 27'. The gear 26 is mounted upon and drives a horizontal shaft 28, the latter being journalled in bearings 28', which depend from the frame 2. The forward end of shaft 28 is fitted with a bevel pinion 28$^a$, the latter meshing and driving a bevel-gear 7$^c$, which is rigid on the lower end of shaft 7', that rotates the table 7. Above the guard 4 the shaft 7' is reduced and extends beyond the top of the press cylinder 5. This portion of the shaft is supported by an arm 5$^b$ of a cap 5$^c$ that closes the top end of said cylinder, and also by a perforated arm 29' of a bracket 29, which is mounted on top of cap 5$^c$. Between the latter bearings, shaft 7' is fitted with a bevel-gear 30, which drives a pinion 30', the latter being mounted on a shaft 30$^a$, which operates a crank 31 of usual construction, by which the plunger 9 is reciprocated. The plunger is connected to the crank by means of a rod 32, as best seen in Fig. 3. The shaft 30$^a$ is supported by brackets 33—33', which are mounted on the cap 5$^c$.

The belt conveyor 19 is supported by pulleys 19'—19$^a$, which are respectively mounted on shafts 19$^b$—19$^c$, the latter being journaled in the opposite ends of a frame 19$^d$. The shaft 19$^b$ extends rearwardly and supports a pulley 34, which is driven by a belt 34', the latter being driven by a similar pulley 23$^c$, which is operated by the main shaft 23.

Having thus described my invention, what I claim, is—

1. In a machine for pressing and molding food products, a constantly rotating table having a plurality of mold cavities arranged in pairs spaced equidistantly, a reciprocating plunger having a semi-cylindrical portion adapted to successively fill the pairs of molds while the latter are passing beneath the plunger, means for conveying the material to the pressing position, and means for spraying the molds with hot oily vapor before they reach the pressing position.

2. In a machine for pressing and molding food products, a constantly rotating table having a plurality of mold cavities arranged in pairs in a circular row, a reciprocating plunger formed with a semi-cylindrical portion adapted to press the material into each pair of molds while the molds are passing beneath said portions, means for continuously conveying the material to the pressing position, means for spraying the molds with hot oily vapor in advance of the filling operations, and means for ejecting the molded articles while the table is in motion.

3. In a machine for molding cakes from sticky plastic material, a constantly rotating table having a plurality of bottomless molds arranged in a concentric row, a plunger arranged to reciprocate at right angles to the plane of the molds for pressing the material into the molds while the latter are moving across the path of the plunger, means for spraying the molds and the adjacent portions of the table with hot oily vapor in advance of each molding operation for preventing the material from adhering to said parts, a worm for conveying the material to be molded towards the molding position, a reciprocating ejector for each mold, said ejectors adapted to form the bottoms of the molds during the molding of the cakes, said ejectors travelling with the table and adapted to eject the cakes without stoppage of the table, and means carried by the table adapted to effect the sweeping of the ejected cakes from the table.

4. A machine for molding sticky plastic material, including an upright press cylinder, a plunger reciprocable in the cylinder, said plunger being semi-cylindrical, a worm extending into the vacant portion of the cylinder adapted to deliver the material to be molded beneath the mutilated plunger, a constantly rotating table disposed beneath the press cylinder having a plurality of mold cavities arranged in pairs adapted to be successively moved across the path of the plunger and to be filled with the material, a guard-plate interposed between the press cylinder and the table having a port facing the table, a steam-pipe supported by said plate adapted to supply steam mixed with oil to the said port for spraying the mold cavities in advance of the molding operations, a circular cam located below the table, and a plurality of ejectors travelling with said table adapted to be reciprocated by said cam for emptying the molds.

5. A machine for molding cakes from sticky plastic material, including a press cylinder having a normally open bottom, a constantly rotating table disposed below and eccentric to the axis of the cylinder, said table being formed with a plurality of pairs of mold cavities spaced equidistantly around its center, said molds adapted to pass beneath the cylinder, a plunger having a semi-cylindrical pressing portion reciprocable in said cylinder in a path that coincides with the path of said mold cavities, a worm conveyor extending into the vacant portion of the cylinder adapted to move the material to be molded into the molding position during the upstrokes of the plunger, means for spraying the mold cavities and the adjacent portions of the table with hot oily moist vapor for preventing the material from adhering to and clogging said parts, and ejectors travelling with the table adapted to close the bottoms of the mold cavities during the pressing operations and to eject the cakes from the molds after they are moved from the path of the plunger.

6. In a machine for molding cakes from sticky plastic material, an upright cylinder, a constantly rotating table having a plurality of pairs of mold cavities facing upwardly and spaced equidistantly, a plunger reciprocable in said cylinder having a semi-cylindrical pressing portion adapted to fill the molds while the latter are passing beneath the said pressing portion, means for conveying the material across the vacant portion of said cylinder to the pressing position, means for stripping the sticky material from the plunger, and means for spraying the molds and the intervening portions of the table with hot oily vapor before the molds reach the filling position.

7. In a press for molding sticky plastic material, a constantly rotating table having a plurality of mold cavities arranged in a concentric row, a stationary guard-plate partially covering the table having an opening across which the molds successively pass and having a port facing the row of molds, means for issuing hot moist oily vapor through said port for heating and lubricating said molds, means for spraying the portion of the table not covered by said plate, a press cylinder supported by said plate, the bore of said cylinder registering with the opening in the plate, a plunger reciprocable in the cylinder and said plate adapted to fill the molds while the latter are passing said opening, means for forcing the material into the press cylinder, and means for ejecting the molded articles after the filled molds pass from beneath the guard-plate.

In testimony whereof I affix my signature.

WILLIAM P. KING.